US006651314B2

United States Patent
Hopeck

(10) Patent No.: US 6,651,314 B2
(45) Date of Patent: Nov. 25, 2003

(54) AIR GAP WINDING METHOD AND SUPPORT STRUCTURE FOR A SUPER CONDUCTING GENERATOR AND METHOD FOR FORMING THE SAME

(75) Inventor: James Frederick Hopeck, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/198,137

(22) Filed: Jul. 19, 2002

(65) Prior Publication Data

US 2002/0180293 A1 Dec. 5, 2002

Related U.S. Application Data

(62) Division of application No. 09/741,905, filed on Dec. 22, 2000.

(51) Int. Cl.[7] .................. H02K 15/12; H02K 15/14; H01F 7/21
(52) U.S. Cl. .................. 29/606; 29/598; 29/596; 29/599; 264/272.19; 264/272.2; 310/42; 310/91
(58) Field of Search .................. 29/596, 598, 606, 29/599, 732, 734, 33 L; 264/272.19, 272.2; 310/42, 91, 258, 254

(56) References Cited

U.S. PATENT DOCUMENTS

| 4,010,393 A | 3/1977 | Lorch et al. |
| 4,031,422 A | 6/1977 | Armor et al. |
| 4,032,874 A | 6/1977 | Kudlacik et al. |
| 4,037,124 A | 7/1977 | Kullmann et al. |
| 4,082,974 A | 4/1978 | Yamamoto et al. |

(List continued on next page.)

FOREIGN PATENT DOCUMENTS

| DE | 30 03 483 A1 | 8/1980 | |
| JP | 52-93903 | 8/1977 | |
| JP | 61-293136 | * 12/1986 | .......... 264/272.2 X |
| SU | 1746477 A1 | 7/1992 | |

OTHER PUBLICATIONS

Seog–Hyeon et al, Evaluation of RTV Coating with Stationary Fog, Electrical Insulation and Dielectric Phenomena, IEEE Catalo No. 95CH35842, pp. 400–403, Oct. 1995.*

"39th GE Turbine State–of–the–Art Technology Seminar", Tab 1,""F" Technology—the First Half–Million Operating Hours", H.E. Miller.

"39th GE Turbine State–of–the–Art Technology Seminar", Tab 2, "GE Heavy–Duty Gas Turbine Performance Characteristics", F. J. Brooks.

"39th GE Turbine State–of–the–Art Technology Seminar", Tab 3, "9EC 50Hz 170–MW Class Gas Turbine", A. S. Arrao.

"39th GE Turbine State–of–the–Art Technology Seminar", Tab 4, "MWS6001FA—An Advanced–Technology 70–MW Class 50/60 Hz Gas Turbine", Ramachandran et al.

"39th GE Turbine State–of–the–Art Technology Seminar", Tab 5, "Turbomachinery Technology Advances at Nuovo Pignone", Benvenuti et al.

(List continued on next page.)

Primary Examiner—A. Dexter Tugbang
(74) Attorney, Agent, or Firm—Nixon & Vanderhye P.C.

(57) ABSTRACT

A method of forming a winding support structure for use with a superconducting rotor wherein the method comprises providing an inner support ring, arranging an outer support ring around the inner support ring, coupling first and second support blocks to the outer support ring and coupling a lamination to the first and second support blocks. A slot is defined between the support blocks and between the outer support ring and the lamination to receive a portion of a winding. An RTV fills any clearance space in the slot.

8 Claims, 4 Drawing Sheets

U.S. PATENT DOCUMENTS

| | | | |
|---|---|---|---|
| 4,454,439 A | | 6/1984 | Okamoto et al. |
| 4,475,052 A | | 10/1984 | Okamoto et al. |
| 4,740,724 A | | 4/1988 | Sato et al. |
| 4,845,837 A | * | 7/1989 | Lloyd .......................... 29/598 |
| 4,859,891 A | | 8/1989 | Jenkins et al. |
| 4,904,890 A | | 2/1990 | Archibald et al. |
| 5,010,638 A | * | 4/1991 | Lanfranco ................... 29/596 |
| 5,027,500 A | | 7/1991 | Keck et al. |
| 5,053,663 A | | 10/1991 | Boer et al. |
| 5,075,959 A | | 12/1991 | Keck et al. |
| 5,118,979 A | | 6/1992 | Shih et al. |
| 5,316,801 A | | 5/1994 | Hopeck |
| 5,329,197 A | | 7/1994 | Kudlacik |
| 5,358,432 A | | 10/1994 | Shih et al. |
| 5,430,340 A | | 7/1995 | Shih et al. |
| 5,473,207 A | | 12/1995 | Hopeck et al. |
| 5,854,525 A | | 12/1998 | Pommelet |
| 5,886,434 A | | 3/1999 | Nygard |
| 5,913,243 A | | 6/1999 | Hopeck et al. |
| 5,986,380 A | | 11/1999 | Kaminski et al. |
| 6,020,670 A | | 2/2000 | Jones et al. |
| 6,127,761 A | | 10/2000 | Shen et al. |
| 6,194,807 B1 | | 2/2001 | Kaminski et al. |

OTHER PUBLICATIONS

"39th GE Turbine State–of–the–Art Technology Seminar", Tab 6, "GE Aeroderivative Gas Turbines—Design and Operating Features", M.W. Horner.

"39th GE Turbine State–of–the–Art Technology Seminar", Tab 7, "Advance Gas Turbine Materials and Coatings", P.W. Schilke.

"39th GE Turbine State–of–the–Art Technology Seminar", Tab 8, "Dry Low $NO_x$ Combustion Systems for GE Heavy–Duty Turbines", L. B. Davis.

"39th GE Turbine State–of–the–Art Technology Seminar", Tab 9, "GE Gas Turbine Combustion Flexibility", M. A. Davi.

"39th GE Turbine State–of–the–Art Technology Seminar", Tab 10, "Gas Fuel Clean–Up System Design Considerations for GE Heavy–Duty Gas Turbines", C. Wilkes.

"39th GE Turbine State–of–the–Art Technology Seminar", Tab 11, "Integrated Control Systems for Advanced Combined Cycles", Chu et al.

"39th GE Turbine State–of–the–Art Technology Seminar", Tab 12, "Power Systems for the 21st Century "H" Gas Turbine Combined Cycles", Paul et al.

"39th GE Turbine State–of–the–Art Technology Seminar", Tab 13, "Clean Coal and Heavy Oil Technologies for Gas Turbines", D. M. Todd.

"39th GE Turbine State–of–the–Art Technology Seminar", Tab 14, "Gas Turbine Conversion, Modifications and Uprates Technology", Stuck et al.

"39th GE Turbine State–of–the–Art Technology Seminar", Tab 15, "Performance and Reliability Improvements for Heavy–Duty Gas Turbines,"J.R. Johnston.

"39th GE Turbine State–of–the–Art Technology Seminar", Tab 16, "Gas Turbine Repair Technology", Crimi et al.

"39th GE Turbine State–of–the–Art Technology Seminar", Tab 17, "Heavy Duty Turbine Operating & Maintenance Considerations", R. F. Hoeft.

"39th GE Turbine State–of–the–Art Technology Seminar", Tab 18, "Gas Turbine Performance Monitoring and Testing", Schmitt et al.

"39th GE Turbine State–of–the–Art Technology Seminar", Tab 19, "Monitoring Service Delivery System and Diagnostics", Madej et al.

"39th GE Turbine State–of–the–Art Technology Seminar", Tab 20, "Steam Turbines for Large Power Applications", Reinker et al.

"39th GE Turbine State–of–the–Art Technology Seminar", Tab 21, "Steam Turbines for Ultrasupercritical Power Plants", Retzlaff et al.

"39th GE Turbine State–of–the–Art Technology Seminar", Tab 22, "Steam Turbine Sustained Efficiency", P. Schofield.

"39th GE Turbine State–of–the–Art Technology Seminar", Tab 23, "Recent Advances in Steam Turbines for Industrial and Cogeneration Applications", Leger et al.

"39th GE Turbine State–of–the–Art Technology Seminar", Tab 24, "Mechanical Drive Steam Turbines", D. R. Leger.

"39th GE Turbine State–of–the–Art Technology Seminar", Tab 25, "Steam Turbines for STAG™ Combined–Cycle Power Systems", M. Boss.

"39th GE Turbine State–of–the–Art Technology Seminar", Tab 26, "Cogeneration Application Considerations", Fisk et al.

"39th GE Turbine State–of–the–Art Technology Seminar", Tab 27, "Performance and Economic Considerations of Repowering Steam Power Plants", Stoll et al.

"39th GE Turbine State–of–the–Art Technology Seminar", Tab 28, "High–Power–Density™ Steam Turbine Design Evolution", J. H. Moore.

"39th GE Turbine State–of–the–Art Technology Seminar", Tab 29, "Advances in Steam Path Technologies", Cofer, IV, et al.

"39th GE Turbine State–of–the–Art Technology Seminar", Tab 30, "Upgradabel Opportunities for Steam Turbines", D. R. Dreier, Jr.

"39th GE Turbine State–of–the–Art Technology Seminar", Tab 31, "Uprate Options for Industrial Turbines", R. C. Beck.

"39th GE Turbine State–of–the–Art Technology Seminar", Tab 32, "Thermal Performance Evaluation and Assessment of Steam Turbine Units", P. Albert.

"39th GE Turbine State–of–the–Art Technology Seminar", Tab 33, "Advances in Welding Repair Technology" J. F. Nolan.

"39th GE Turbine State–of–the–Art Technology Seminar", Tab 34, "Operation and Maintenance Strategies to Enhance Plant Profitability", MacGillivray et al.

"39th GE Turbine State–of–the–Art Technology Seminar", Tab 35, "Generator Insitu Inspections", D. Stanton "39th GE Turbine State–of–the–Art Technology Seminar", Tab 36, "Generator Upgrade and Rewind", Halpern et al.

"39th GE Turbine State–of–the–Art Technology Seminar", Tab 37, "GE Combined Cycle Product Line and Performance", Chase, et al.

"39th GE Turbine State–of–the–Art Technology Seminar", Tab 38, "GE Combined Cycle Experience", Maslak et al.

"39th GE Turbine State–of–the–Art Technology Seminar", Tab 39, "Single–Shaft Combined Cycle Power Generation Systems", Tomlinson et al.

"Advanced Turbine System Program—Conceptual Design and Product Development", Annual Report, Sep. 1, 1994—Aug. 31, 1995.

"Advanced Turbine Systems (ATS Program) Conceptual Design and Product Development", Final Technical Progress Report, vol. 2– Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993—Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176–11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3.

"Proceedings of the Advanced Turbine Systems Annual Program Review Meeting", vol. I, "H Gas Turbine Combined Cycle", J. Corman, p. 14.

"Proceedings of the Advanced Turbine Systems Annual Program Review Meeting", vol. I, "Overview of Westinghouse's Advanced Turbine Systems Program", Bannister et al., p. 22.

"Proceedings of the Advanced Turbine Systems Annual Program Review Meeting", vol. I, "Allison Engine ATS Program Technical Review", D. Mukavetz, p. 31.

"Proceedings of the Advanced Turbine Systems Annual Program Review Meeting", vol. I, "Advanced Turbine Systems Program Industrial System Concept Development", S. Gates, p . 43.

"Proceedings of the Advanced Turbine Systems Annual Program Review Meeting", vol. I, "Advanced Turbine System Program Phase 2 Cycle Selection", Latcovich, Jr., p. 64.

"Proceedings of the Advanced Turbine Systems Annual Program Review Meeting", vol. I, "General Electric ATS Program Technical Review Phase 2 Activities", Chance et al., p. 70.

"Proceedings of the Advanced Turbine Systems Annual Program Review Meeting", vol. I, "Technical Review of Westinghouse's Advanced Turbine Systems Program", Diakunchak et al., p. 75.

"Proceedings of the Advanced Turbine Systems Annual Program Review Meeting", vol. I, "Advanced Combustion Turbines and Cycles: An EPRI Perspective", Touchton et al., p. 87.

"Proceedings of the Advanced Turbine Systems Annual Program Review Meeting", vol. I, "Advanced Turbine Systems Annual Program Review", William E. Koop, p. 89.

"Proceedings of the Advanced Turbine Systems Annual Program Review Meeting", vol. I, "The AGTSR Consortium: An Update", Fant et al., p. 93.

"Proceedings of the Advanced Turbine Systems Annual Program Review Meeting", vol. I, "Overview of Allison/AGTSR Interactions", Sy A. Ali, p. 103.

"Proceedings of the Advanced Turbine Systems Annual Program Review Meeting", vol. I, "Design Factors for Stable Lean Premix Combustion", Richards et al., p. 107.

"Proceedings of the Advanced Turbine Systems Annual Program Review Meeting", vol. I, "Ceramic Stationary as Turbine", M. van Roode, p. 114.

"Proceedings of the Advanced Turbine Systems Annual Program Review Meeting", vol. I, "DOE/Allison Ceramic Vane Effort", Wenglarz et al., p. 148.

"Proceedings of the Advanced Turbine Systems Annual Program Review Meeting", vol. I, "Materials/Manufacturing Element of the Advanced Turbine Systems Program", Karnitz et al., p. 152.

"Proceedings of the Advanced Turbine Systems Annual Program Review Meeting", vol. I, "Land–Based Turbine Casting Initiative", Mueller et al., p. 161.

"Proceedings of the Advanced Turbine Systems Annual Program Review Meeting", vol. I, "Pratt & Whitney Thermal Barrier Coatings", Bornstein et al., p. 182.

"Proceedings of the Advanced Turbine Systems Annual Program Review Meeting", vol. I, "Westinhouse Thermal Barrier Coatings",Goedjen et al., p. 194.

"Proceedings of the Advanced Turbine Systems Annual Program Review Meeting", vol. I, "High Performance Steam Development", Duffy et al., p. 200.

"Proceedings of the Advanced Turbine Systems Annual Program Review Meeting", vol. II, "Lean Premixed Combustion Stabilized by Radiation Feedback and heterogeneous Catalysis", Dibble et al., p. 221.

"Proceedings of the Advanced Turbine Systems Annual Program Review Meeting", vol. II, Raleigh/Raman/LIF Measurements in a Turbulent Lean Premixed Combustor, Nandula et al. p. 233.

"Proceedings of the Advanced Turbine Systems Annual Program Review Meeting", vol. II, "Lean Premixed Flames for Low $No_x$ Combustors", Sojka et al., p. 249.

"Proceedings of the Advanced Turbine Systems Annual Program Review Meeting", vol. II, "Functionally Gradient Materials for Thermal Barrier Coatings in Advanced Gas Turbine Systems", Banovic et al, p. 276.

"Proceedings of the Advanced Turbine Systems Annual Program Review Meeting", vol. II, "Advanced Turbine Cooling, Heat Transfer, and Aerodynamic Studies", Han et al., p. 281.

"Proceedings of the Advanced Turbine Systems Annual Program Review Meeting", vol. II, "Life Prediction of Advanced Materials for Gas Turbine Application", Zamrik et al., p. 310.

"Proceedings of the Advanced Turbine Systems Annual Program Review Meeting", vol. II, "Advanced Combustion Technologies for Gas Turbine Power Plants", Vandsburger et al., p. 328.

"Proceedings of the Advanced Turbine Systems Annual Program Review Meeting", vol. II, "Combustion Modeling in Advanced Gas Turbine Systems", Smoot et al., p. 353.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371.

"Proceedings of the Advanced Turbine Systems Annual Program Review Meeting", vol. II, "Rotational Effects on Turbine Blade Cooling", Govatzidakia et al., p. 391.

"Proceedings of the Advanced Turbine Systems Annual Program Review Meeting", vol. II, "Manifold Methods for Methane Combustion", Yang et al., p. 393.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annual Program Review Meeting", vol. II, The Role of Reactant Unmixedness, Strain Rate, and Length Scale on Premixed Combustor Performance, Samuelsen et al., p. 415.

"Proceedings of the Advanced Turbine Systems Annual Program Review Meeting", vol. II, "Experimental and Computational Studies of Film Cooling With Compound Angle Injection", Goldstein et al., p. 423.

"Proceedings of the Advanced Turbine Systems Annual Program Review Meeting", vol. II, "Compatibility of Gas Turbine Materials with Steam Cooling", Desai et al., p. 452.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465.

"Proceedings of the Advanced Turbine Systems Annual Program Review Meeting", vol. II, Effects of Geometry on Slot–Jet Film Cooling Performance, Hyams et al., p. 474.

"Proceedings of the Advanced Turbine Systems Annual Program Review Meeting", vol. II, "Steam as Turbine Blade Coolant: Experimental Data Generation", Wilmsen et al., p. 497.

"Proceedings of the Advanced Turbine Systems Annual Program Review Meeting", vol. II, "Combustion Chemical Vapor Deposited Coatings for Thermal Barrier Coating Systems", Hampikian et al., p. 506.

"Proceedings of the Advanced Turbine Systems Annual Program Review Meeting", vol. II, "Premixed Burner Experiments: Geometry, Mixing, and Flame Structure Issues", Gupta et al., p. 516.

"Proceedings of the Advanced Turbine Systems Annual Program Review Meeting", vol. II, "Intercooler Flow Path for Gas Turbines: CFD Design and Experiments", Agrawal et al., p. 529.

"Proceedings of the Advanced Turbine Systems Annual Program Review Meeting", vol. II, "Bond Strength and Stress Measurements in Thermal Barrier Coatings", Gell et al., p. 539.

"Proceedings of the Advanced Turbine Systems Annual Program Review Meeting", vol. II, "Active Control of Combustion Instabilities in Low $NO_x$ Gas Turbines", Zinn et al., p. 550.

"Proceedings of the Advanced Turbine Systems Annual Program Review Meeting", vol. II, "Combustion Instability Modeling and Analysis", Santoro et al., p. 552.

"Proceedings of the Advanced Turbine Systems Annual Program Review Meeting", vol. II, "Flow and Heat Transfer in Gas Turbine Disk Cavities Subject ot Nonuniform External Pressure Field", Roy et al., p. 560.

"Proceedings of the Advanced Turbine Systems Annual Program Review Meeting", vol. II, "Heat Pipe Turbine Vane Cooling", Langston et al., p. 566.

"Proceedings of the Advanced Turbine Systems Annual Program Review Meeting", vol. II, "Improved Modeling Techniques for Turbomachinery Flow Fields", Lakshminarayana et al, p. 573.

"Proceedings of the Advanced Turbine Systems Annual Program Review Meeting", vol. II, "Advanced 3D Inverse Method for Designing Turbomachine Blades", T. Dang, p. 582.

"Proceedings of the Advanced Turbine Systems Annual Program Review Meeting", "ATS and the Industries of the Future", Denise Swink, p. 1.

"Proceedings of the Advanced Turbine Systems Annual Program Review Meeting", "Gas Turbine Association Agenda", William H. Day, p. 3.

"Proceedings of the Advanced Turbine Systems Annual Program Review Meeting", "Power Needs in the Chemical Industry", Keith Davidson, p. 17.

"Proceedings of the Advanced Turbine Systems Annual Program Review Meeting", "Advanced Turbine Systems Program Overview", David Esbeck, p. 27.

"Proceedings of the Advanced Turbine Systems Annual Program Review Meeting", "Westinghouse's Advanced Turbine Systems Program", Gerard McQuiggan, p. 35.

"Proceedings of the Advanced Turbine Systems Annual Program Review Meeting", "Overview of GE's H Gas Turbine Combined Cycle", Cook et al., p. 49.

"Proceedings of the Advanced Turbine Systems Annual Program Review Meeting", "Allison Advanced Simple Cycle Gas Turbine System", William D. Weisbrod, p. 73.

"Proceedings of the Advanced Turbine Systems Annual Program Review Meeting", "The AGTSR Industry–University Consortium", Lawrence P. Golan, p. 95.

"Proceedings of the Advanced Turbine Systems Annual Program Review Meeting", "$NO_x$ and CO Emissions Models for Gas–Fired Lean–Premixed Combustion Turbines", A. Mellor, p. 111.

"Proceedings of the Advanced Turbine Systems Annual Program Review Meeting", "Methodologies for Active Mixing and Combustion Control", Uri Vandsburger, p. 123.

"Proceedings of the Advanced Turbine Systems Annual Program Review Meeting", "Combustion Modeling in Advanced Gas Turbine Systems", Paul O. Hedman, p. 157.

"Proceedings of the Advanced Turbine Systems Annual Program Review Meeting", "Manifold Methods for Methane Combustion", Stephen B. Pope, p. 181.

"Proceedings of the Advanced Turbine Systems Annual Program Review Meeting", "The Role of Reactant Unmixedness, Strain Rate, and Length Scale on Premixed Combustor Performance", Scott Samuelsen, p. 189.

"Proceedings of the Advanced Turbine Systems Annual Program Review Meeting", "Effect of Swirl and Momentum Distribution on Temperature Distribution in Premixed Flames", Ashwani K. Gupta, p. 211.

"Proceedings of the Advanced Turbine Systems Annual Program Review Meeting", "Combustion Instability Studies Application to Land–Based Gas Turbine Combustors", Robert J. Santoro, p. 233.

"Proceedings of the Advanced Turbine Systems Annual Program Review Meeting", "Active Control of Combustion Instabilities in Low $NO_x$ Turbines", Ben T. Zinn, p. 253.

"Proceedings of the Advanced Turbine Sytems Annual Program Review Meeting", "Life Prediction of Advanced Materials for Gas Turbine Application," Sam Y. Zamrik, p. 265.

"Proceedings of the Advanced Turbine Systems Annual Program Review Meeting", "Combustion Chemical Vapor Deposited Coatings for Thermal Barrier Coating Systems", W. Brent Carter, p. 275.

"Proceedings of the Advanced Turbine Systems Annual Program Review Meeting", "Compatibility of Gas Turbine Materials with Steam Cooling", Vimal Desai, p. 291.

"Proceedings of the Advanced Turbine Systems Annual Program Review Meeting", "Bond Strength and Stress Measurements in Thermal Barrier Coatings", Maurice Gell, p. 315.

"Proceedings of the Advanced Turbine Systems Annual Program Review Meeting", "Advanced Multistage Turbine Blade Aerodymanics, Performance, Cooling and Heat Transfer", Sanford Fleeter, p. 335.

"Proceedings of the Advanced Turbine Systems Annual Program Review Meeting", "Flow Characteristics of an Intercooler System for Power Generating Gas Turbines", Ajay K. Agrawal, p. 357.

"Proceedings of the Advanced Turbine Systems Annual Program Review Meeting", "Improved Modeling Techniques for Turbomachinery Flow Fields", B. Lakshiminarayana, p. 371.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393.

"Proceedings of the Advanced Turbine Systems Annual Program Review Meeting", "Advanced Turbine Cooling, Heat Transfer, and Aerodynamic Studies", Je–Chin Han, p. 407.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427.

"Proceedings of the Advanced Turbine Systems Annual Program Review Meeting", "Experimental and Computational Studies of Film Cooling with Compound Angle Injection", R. Goldstein, p. 447.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461.

"Proceedings of the Advanced Turbine Systems Annual Program Review Meeting", "Steam as a Turbine Blade Coolant: External Side Heat Transfer", Abraham Engeda, p. 471.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483.

"Proceedings of the Advanced Turbine Systems Annual Program Review Meeting", "Closed–Loop Mist/Steam Cooling for Advanced Turbine Systems", Ting Wang, p. 499.

"Proceedings of the Advanced Turbine Systems Annual Program Review Meeting", "Heat Pipe Turbine Vane Cooling", Langston et al., p. 513.

"Proceedings of the Advanced Turbine Systems Annual Program Review Meeting", "EPRI's Combustion Turbine Program: Status and Future Directions", Arthur Cohn, p. 535.

"Proceedings of the Advanced Turbine Systems Annual Program Review Meeting", "ATS Materials Support", Michael Karnitz, p. 553.

"Proceedings of the Advanced Turbine Systems Annual Program Review Meeting", "Land Based Turbine Casting Initiative", Boyd A. Mueller, p. 577.

"Proceedings of the Advanced Turbine Systems Annual Program Review Meeting", "Turbine Airfoil Manufacturing Technology", Charles S. Kortovich, p. 593.

"Proceedings of the Advanced Turbine Systems Annual Program Review Meeting", "Hot Corrosion Testing of TBS's", Norman Bornstein, p. 623.

"Proceedings of the Advanced Turbine Systems Annual Program Review Meeting", "Ceramic Stationary Gas Turbine", Mark van Roode, p. 633.

"Proceedings of the Advanced Turbine Systems Annual Program Review Meeting", "Western European Status of Ceramics for Gas Turbines", Tibor Bornemisza, p. 659.

"Proceedings of the Advanced Turbine Systems Annual Program Review Meeting", "Status of Ceramic Gas Turbines in Russia", Mark Van Roode, p. 671.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda.

"Testing Program Results Validate GE's H Gas Turbine—High Efficiency, Low Cost of Electricity and Low Emissions", Slide Presentation—working draft.

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #48640, Oct. 1– Dec. 31, 1996, Publication Date, Jun. 1, 1997, Report Nos.: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos: DOE/MC/31176–10.

"Utility Advanced Turbine System (ATS) Technology Readiness Testing and Pre–Commercial Demonstration, Phase 3", Document #486029, Oct. 1—Dec. 31, 1995, Publication Date, May 1, 1997, Report Nos.: Doe/MC/31176–5340.

"Utility Advanced Turbine System (ATS) Technology Readiness Testing and Pre–Commercial Demonstration—Phase 3", Document #486132, Apr. 1—Jun. 30, 1976, Publication Date, Dec. 31, 1996, Report Nos: DOE/MC31176–5660.

"Utility Advanced Turbine System (ATS) Technology Readiness Testing and Pre–Commercial Demonstration—Phase 3", Document #587906, Jul. 1—Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration" Document #666277, Apr. 1—Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration", Jan. 1—Mar. 31, 1996, DOE/MC/31176–5338.

"Utility Advanced Turbine System (ATS) Technology Readiness Testing: Phase 3R", Document #756552, Apr. 1—Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1—Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995—Sep. 30, 1996.

"Utility Advanced Turbine Systems (ATS) Technology Readiness Testing", Phase 3R, Annual Technical Progress Report, Reporting Period: Oct. 1, 1997—Sep. 30, 1998.

"Utility Advanced Turbine Systems (ATS) Technology Readiness Testing", Document #750405, Oct. 1—Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1—Jun. 29, 1998, Publication Date Oct. 29, 1998, Report Nos. DE–FC21–95MC31176–18.

"Utility Advanced Turbine Systems (ATS) Technology Readiness Testing—Phase 3", Annual Technical Progress Report, Reporting Period: Oct. 1, 1996—Sep. 30, 1997.

"Utility Advanced Turbine Systems (ATS) Technology Readiness Testing and Pre–Commercial Demonstration", Quarterly Report, Jan. 1—Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

AIR GAP WINDING METHOD AND SUPPORT STRUCTURE FOR A SUPER CONDUCTING GENERATOR AND METHOD FOR FORMING THE SAME

This is a division of Application Ser. No. 09/741,905, filed Dec. 22, 2000, the entire content of which is hereby incorporated by reference in this application.

This invention was made with government support under government contract no. DEFC0293CH10589 awarded by the Department of Energy. The government has certain rights to this invention.

BACKGROUND OF THE INVENTION

This invention relates to electric machines such as electric power generators and electric motors, and in particular to a stator winding support structure for use with a superconducting rotor.

In order to generate current, an electric generator typically includes a rotor and a stator, each of which contains a winding. The rotor is conventionally arranged within the stator to define an air gap therebetween.

The stator conventionally includes a frame and a cylindrically-shaped core having magnetic teeth on its inner circumference. The teeth of the stator core form a plurality slots which receive the stator winding and therefore provide radial and tangential winding support. The teeth of the stator core also provide a grounding plane since the stator winding contacts the teeth. These teeth, however, are not desirable or needed when the rotor winding is formed by a superconducting winding that produces a very strong magnetic field. In the absence of the teeth, the stator winding is arranged within the magnetic field and thus produces both tangential and radial pulsating forces imposed on itself. While the tangential forces provide useful torque during normal operation, the radial forces produce an undesirable stator winding vibration.

Several attempts have been made in the past to produce a superconducting generator in the 10/20 MVA size. Only limited success has been achieved, however, to support and hold a stator winding against the strong magnetic field produced by the superconducting rotor. This limited success has resulted, for example, from a very complex helical armature or air gap windings requiring numerous complex spring and tie devices.

It would thus be beneficial to provide a support structure for a stator winding for use with a superconducting rotor which supports the air gap between the rotor and stator and which transmits the torque between the stator and rotor while preventing stator winding vibration. The support structure supports and holds the stator winding circumferentially and radially against the stator core. It would be further beneficial to provide the support structure with a minimum number of parts and a minimum amount of complexity and cost.

BRIEF SUMMARY OF THE INVENTION

In accordance with an exemplary embodiment of the present invention, a winding support structure for use with a superconducting rotor comprises an inner support ring, an outer support ring arranged around an outer circumference of the inner support ring, first and second support blocks coupled to said outer support ring and a lamination coupled to the first and second support blocks. A slot is defined between the support blocks and between the outer support ring and the lamination to receive a portion of a winding. The inner ring is a solid ring and the outer ring is a split ring. The outer ring expands to produce a radially outward force against the support blocks when the inner ring is moved axially with respect to the outer ring. The winding support structure may also comprise another inner support ring and another outer support ring which is arranged around the outer circumference of the another inner support ring and is coupled to the lamination. A clearance space in the slot is filled with a RTV. The winding structure may also comprise a third support block coupled to the outer support ring to define another slot between the second and third support blocks to receive another portion of the winding. The winding support structure transmits torque and prevents stator winding vibration.

In accordance with another exemplary embodiment of the present invention, a method of forming a winding support structure for use with a superconducting rotor comprises providing a lamination, coupling first and second support blocks to the lamination, providing an inner support ring and an outer support ring around an outer circumference of the inner support ring, and coupling the lamination and the support blocks to the outer ring to define a slot between the support blocks and between the lamination and the outer ring to receive a portion of a winding. An RTV is applied into a clearance space in the slot. Wedges are respectively arranged between adjacent bars forming the winding prior to applying the RTV into the clearance space and then removed after applying the RTV into the clearance space. Additional RTV is applied in a space where the wedges are removed. Coupling the lamination and the support blocks to the outer support ring comprises pulling the winding to the outer support ring and tying the winding to the inner and outer support rings. Providing an inner support ring and an outer support ring comprises providing a solid ring and a split ring, respectively. The outer ring expands to produce a radially outward force against the support blocks when the inner ring is moved axially with respect to the outer ring. Another outer support ring can be provided around an outer circumference of another inner support ring and coupled to the lamination. A third support block may be coupled to the outer support ring to define another slot between the second and third support blocks to receive another portion of the winding. The method of forming the winding support is accomplished using a minimal number of parts and minimal construction cost.

In accordance with yet another exemplary embodiment of the present invention, an apparatus for use with a superconducting rotor comprises an inner support ring, an outer support ring arranged around an outer circumference of the inner support ring, first and second support blocks coupled to the outer support ring, a lamination coupled to the first and second support blocks, and a winding. A portion of the winding is arranged within a slot that is defined between the support blocks and between the outer ring and the lamination. The inner ring is a solid ring and the outer ring is a split ring. The outer ring expands to produce a radially outward force against the support blocks and the winding when the inner ring is moved axially with respect to the outer ring. A clearance space in the slot is filled with an RTV. The apparatus can further comprise another inner support ring and another outer support ring which is arranged around the another inner support ring and coupled to the lamination. The apparatus can further comprise a third support block coupled to the outer support ring to define another slot between the second and third support blocks and between the outer support ring and the lamination, another portion of the winding being arranged in the another slot.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
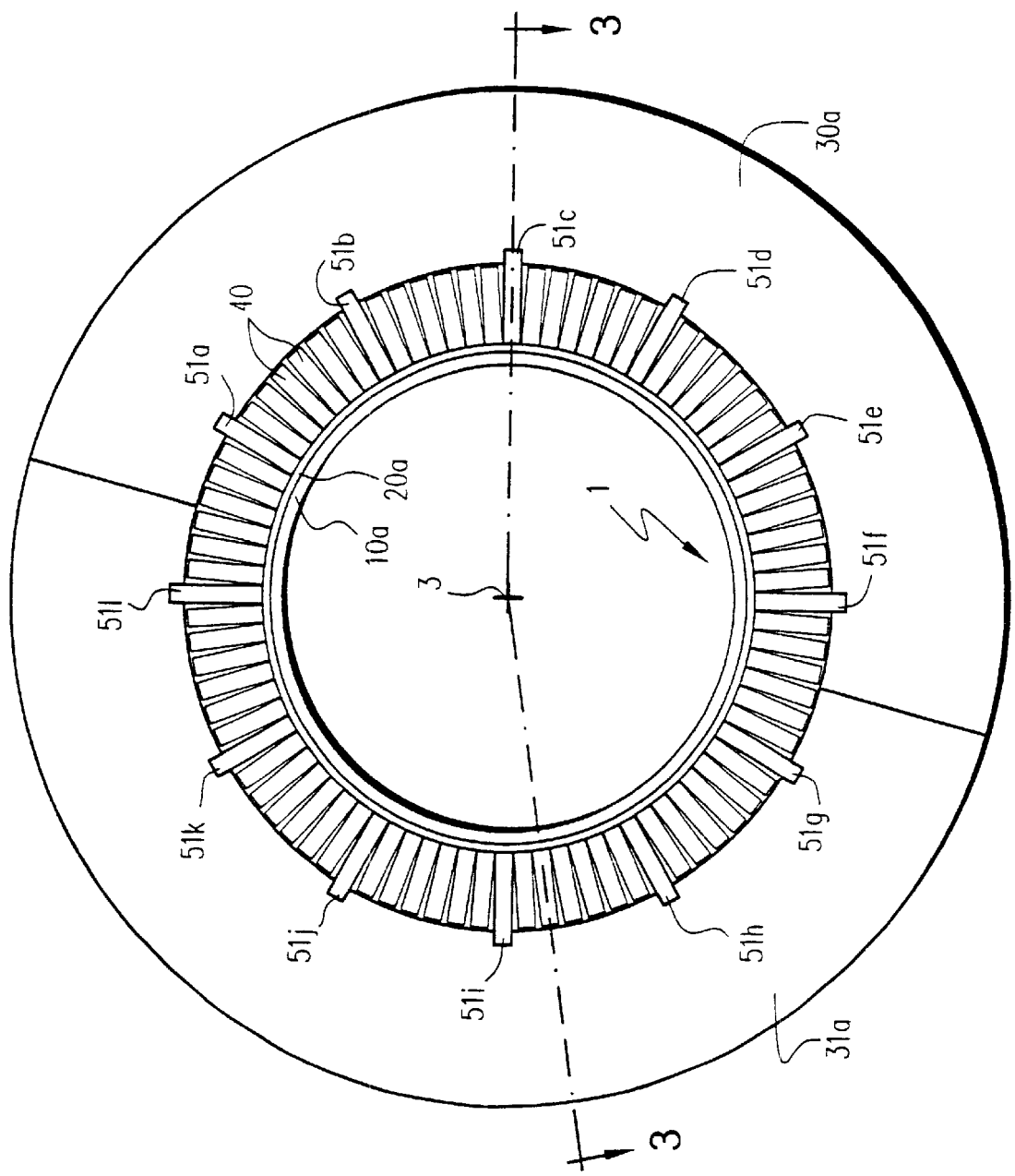
FIG. 1 is a top view of, inter alia, a winding support structure in accordance with an exemplary embodiment of the present invention.
Figure 2:
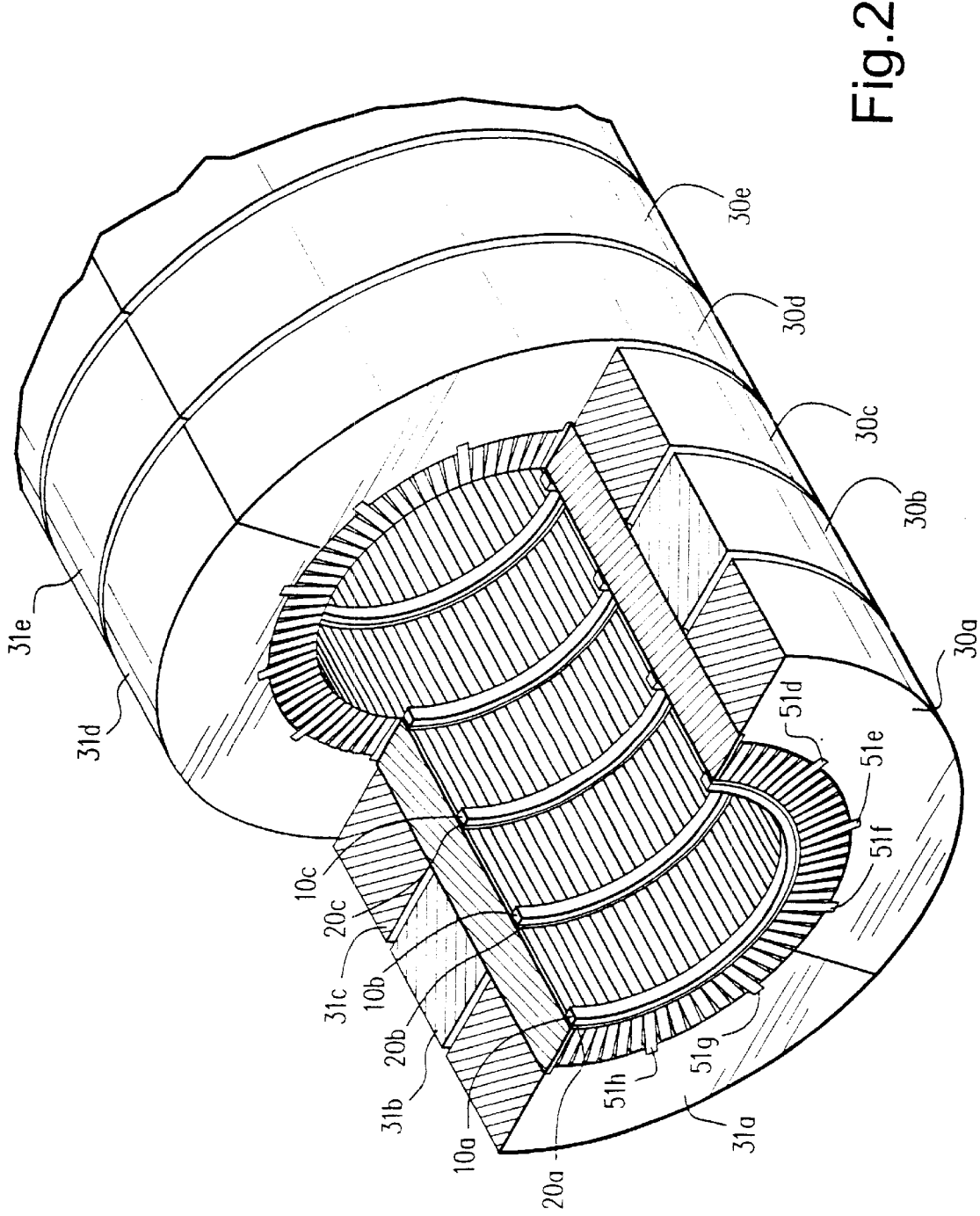
FIG. 2 is a cutaway view of, inter alia, a winding support structure shown if FIG. 1.
Figure 3:
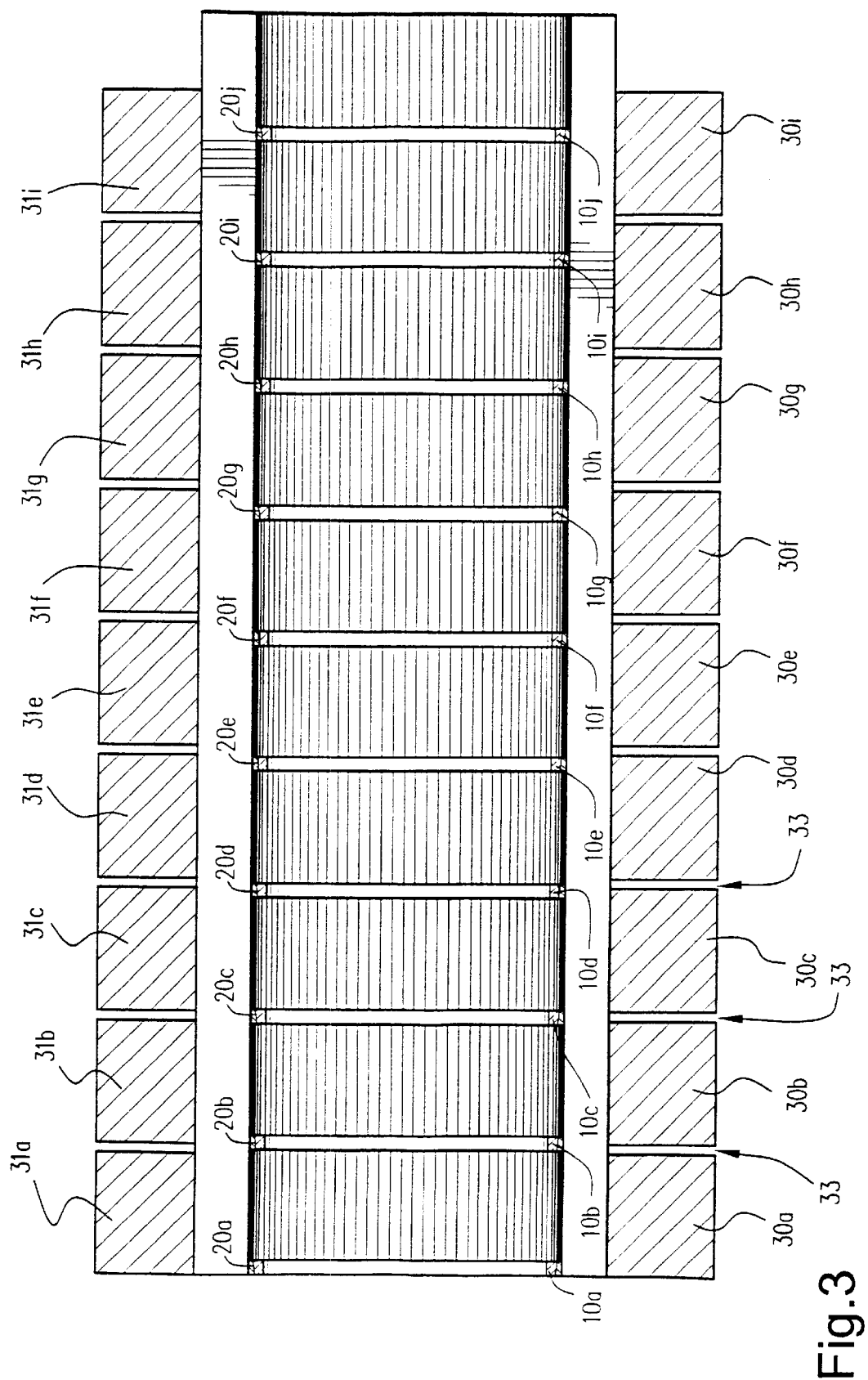
FIG. 3 is a cross-sectional view taken from line 3—3 in FIG. 1.

FIGS. 1–3 illustrate a winding support structure 1 in accordance with an exemplary embodiment of the present invention. The winding support structure 1 can be used, for example, in a 100 MVA or larger generator which includes a superconducting rotor (not shown) and a stator. The support structure 1 supports a stator winding 40 comprising a plurality of bars so that the support structure 1 transmits torque between the rotor and the stator of the generator and prevents stator winding vibration while in the presence of a strong magnetic field produced by the superconducting rotor. The bars of the winding 40 are formed, cooled, insulated and grounded in a conventional manner.

The support structure 1 includes a plurality of inner support rings 10a–10j, a plurality of outer support rings 20a–20j, a plurality of laminations 30a–30i, 31a–31i, a plurality of support blocks 51a–51l and an RTV 42. The inner support rings 10a–10j are centered about a longitudinal axis 3 of the support structure 1 and are spaced axially apart along the direction of the longitudinal axis 3. The outer support rings 20a–20j are respectively arranged around the outer circumferences of the inner support rings 10a–10j. Each one of the laminations 30a–30i to 31a–31i forms a semi-circle portion and a pair of laminations (e.g., 30a, 31a) together forms a complete circumference of the support structure 1. Those skilled in the art will appreciate that the complete circumferences can be formed by dividing the laminations into more than two semi-circle portions. The laminations 30b–30i and 31b–31i are stacked in the axial direction (i.e., along the direction parallel to the longitudinal axis 3) with respect to laminations 30a, 31a, respectively, to form a core of the stator. Gaps 33 are interposed between each of the laminations 30a–31i, 31a–31i in the axial direction to allow for air cooling of the winding 40. Alternatively, a cooling pad (not shown) such as a water cooling pad can be interposed between each of the laminations 30a–30i, 31a–31i in the axial direction. While the discussion below focuses primarily on only one inner support ring 10a, one outer support ring 20a, one laminations 30a, and two support blocks 51a–51b in detail, those skilled in the art will appreciate that similar comments apply to the others forming the support structure 1.

Figure 4:
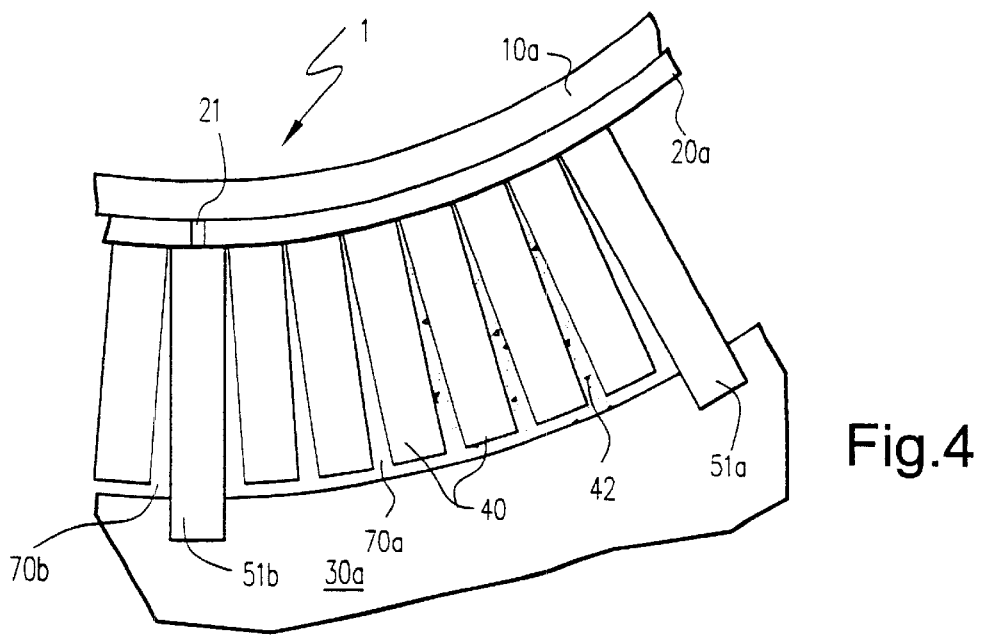
FIG. 4 is a partial cross-sectional view illustrating details of the winding support structure shown in FIG. 1.

Referring now to FIG. 4, the lamination 30a has a plurality of square or rectangular-shaped notches formed (e.g., punched) in its inner periphery. The size of the notches are such that first and second support blocks 51a, 51b of the plurality of support blocks 51a–51l are each tightly engaged and held in respective notches. Specifically, an end of each of the support blocks 51a, 51b which is radially furthest from the axis 3 (see FIG. 1) is engaged into respective notches of the lamination 30a with a close fit. The lamination 30a is thus a "toothless" lamination to the extent that it does not include a magnetic teeth which are, for example, integral with the lamination 30a. The support blocks 51a, 51b are preferably formed by a G11 or similar epoxy glass.

Some of the bars of the winding 40, preferably forming a single layer, are then inserted into a slot 70a which is defined between the first and second support blocks 51a, 51b. In the exemplary embodiment illustrated in FIG. 4, six bars of the winding 40 are inserted into the slot 70a defined between the first and second support blocks 51a, 51b. The space in the slot 70a between the support blocks 51a, 51b has dimensions such that a clearance space can be defined in the slot 70a between each of the bars of the winding 40, between each of the support blocks 51a, 51b and the bar positioned closest thereto, and between the bars and the lamination 30a.

Figure 5:
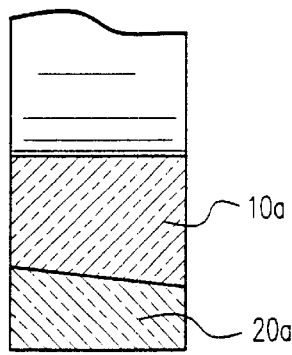
FIG. 5 is a detailed partial cross sectional view illustrating details of the inner and outer support rings illustrated in FIG. 4.

The inner and outer support rings 10a, 20a are designed to be able withstand the radial inward forces imposed, for example, by the weight of laminations 30a, 31a. The inner and outer support rings 10a, 20a are both preferably made of a filament wound epoxy glass. The inner support ring 10a is a solid ring. The outer support ring 20a has an expansion gap 21 and thus forms a split ring. The support rings 10a, 20a effectively form a two piece fitted incline plane (see FIG. 5) so that when the inner (solid) support ring 10a is moved axially with respect to the outer (split) support ring 20a, the outer ring 10a expands via the expansion gap 21 to produce a radially outward force against the winding 40, laminations 30a, 31a and the support blocks 51a–51h.

During construction of the support structure 1, the support rings 10a, 20a are arranged in the bore of the stator. The winding 40 is then pulled radially inward and securely tied to the support rings 10a, 20b using a roving glass tie (not shown). Specifically, the roving glass tie is arranged around each bar of the winding 40 to cinch the bars to the outer support ring 20. When the construction is completed, the ends of the bars of winding 40 which are closest to the longitudinal axis 3 contact the outer support ring 20a. The ends of the first and second support blocks 51a, 51b which are radially closest to the longitudinal axis 3 (i.e., those ends of the support blocks 51a, 51b which are not engaged in respective notches of the lamination 30a) also contact the outer support ring 20a. The slot 70a defined between the first and second support blocks 51a, 51b in the circumferential direction is thus also defined between the outer support ring 20a and the lamination 30a in the radial direction.

Referring now to FIGS. 1 and 4, the winding support structure 1 further includes a glass support block 51c of the plurality of support blocks 51a–51i. Like the other support blocks 51a–51b, 51d–51i, the third support block 51c is preferably formed by a G11 or similar epoxy glass. The third support block 51c is engaged at one end in a notch of the lamination 30a and contacts the outer support ring 20a at the other end (i.e., the end radially closest to the longitudinal axis 3). Another slot 70b is thus formed between the second and third support blocks 51b, 51c in the circumferential direction and between the outer support ring 20a and the lamination 30a in the radial direction. The another slot 70b encloses another six bars of the winding 40a. As those skilled in the art will appreciate, additional slots can be formed in a similar manner. Again, similar comments of the foregoing description apply to all other laminations, inner and outer support rings and support blocks, slots, etc. forming the support structure.

As noted above, clearance space is formed in the slot 70a of the lamination 30a between the support blocks 51a, 51b. This clearance space exists, for example, between the bars of the winding 40, between each support block 51a, 51b and the closest bar of the winding 40, and between the bars and a face of the lamination 30a defining the slot 70a. In order to restrict the movement of the winding 40 caused by the electromagnetic forces of the generator and to ensure that the winding 40 electrically contacts the lamination 30a, the clearance space is filled by a high conductivity, high compression RTV 42.

Figure 6:
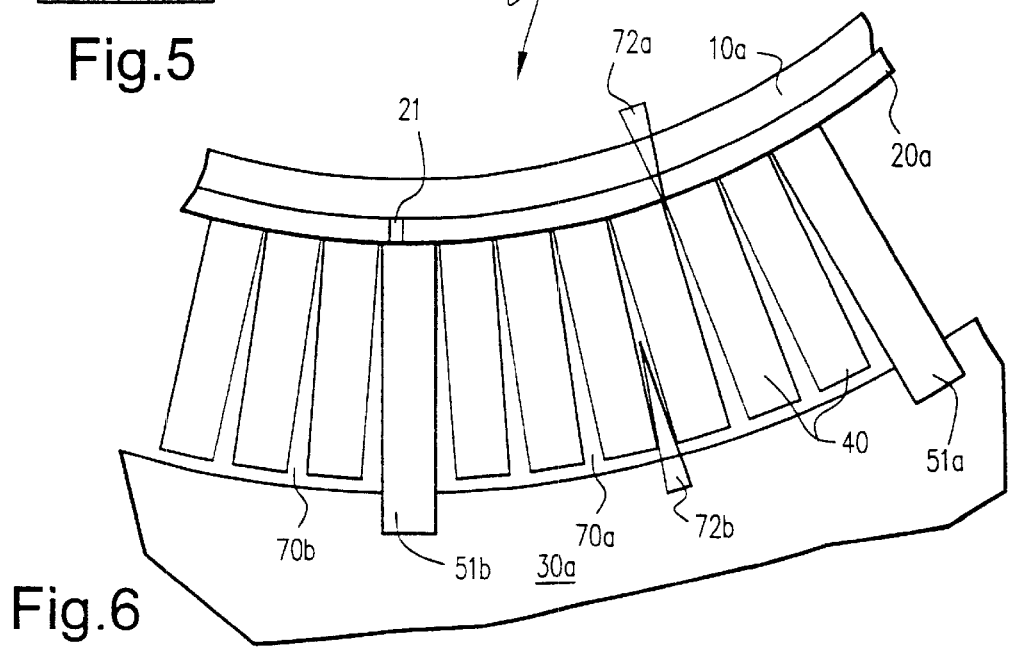
FIG. 6 is a partial cross-sectional view of, inter alia, a winding support structure which incorporates wedges during its construction in accordance with an exemplary embodiment of the present invention.

As illustrated in FIG. 6, prior to filling the clearance space in the slot 70a with a RTV 42, at least one teflon wedge 72a is placed on the inside diameter between two bars of the winding 40 to contain the RTV 42. Additionally, at least one teflon wedge 72b is arranged on the outside diameter between two bars of the winding 40. After the RTV 42 is applied to fill the clearance space, the wedges 72a, 72b are removed and additional RTV 42 is applied to fill the void formed where the wedges 72a, 72b are removed. The RTV 42 can be applied into the clearance space through radial tubes (not shown) spaced around the circumference of the stator core which allow the injection of the RTV 42. Cooling pads similar to those disclosed in the commonly assigned U.S. Pat. No. 5,473,207 (Hopeck et al, "Cooling Pads for Water-Cooled Stator Cores in Dynamoelectric Machines and Methods of Fabrication"), the contents of which are incorporated herein by reference, can also be provided on the outer circumference of the stator core and have provisions for the addition of the radial tubes for RTV injection.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a winding support structure, the method comprising:

providing a lamination;

coupling first and second support blocks to said lamination;

providing an inner support ring and an outer support ring around an outer circumference of said inner support ring;

coupling said lamination and said support blocks to said outer ring to define a slot between said support blocks and between said lamination and said outer ring to receive a portion of a winding;

applying a RTV into a clearance space in said slot;

arranging wedges respectively between adjacent bars forming said winding prior to applying said RTV into said clearance space; and removing said wedges after applying said RTV into said clearance space, and applying additional RTV in a space where wedges were removed.

2. The method of claim 1, wherein providing the inner support ring and the outer support ring comprises providing a solid ring and a split ring, respectively, said outer support ring being capable of expanding to produce a radially outward force against said support blocks when said inner support ring is moved axially with respect to said outer support ring.

3. The method of claim 1 further comprising providing another outer support ring around an outer circumference of another inner support ring and coupling said another outer support ring to said first and second support blocks.

4. The method of claim 1 further comprising coupling third support block to said outer support ring to define another slot between said second and third support blocks to receive another portion of said winding.

5. A method of forming a winding support structure for use with a superconducting rotor comprising:

providing a lamination;

coupling first and second support blocks to said lamination;

providing an inner support ring and an outer support ring around an outer circumference of said inner support ring; and coupling said lamination and said support blocks to said outer ring to define a slot between said support blocks and between said lamination and said outer ring to receive a portion of a winding;

wherein coupling said lamination and said support blocks to said outer support ring comprises pulling said winding to said outer support ring and tying said winding to said inner and outer support rings.

6. The method of claim 5 providing the inner support ring and the outer support ring comprises providing a solid ring and a split ring, respectively, said outer support ring being capable of expanding to produce a radially outward force against said support blocks when said inner support ring is moved axially with respect to said outer support ring.

7. The method of claim 5 further comprising another outer support ring around an outer circumference of another inner support ring and coupling said another outer support ring to said first and second support blocks.

8. The method of claim 5 further comprising coupling a third support block to said outer support ring to define another slot between said second and third support blocks to receive another portion of said winding.

* * * * *

UNITED STATES PATENT AND TRADEMARK OFFICE
CERTIFICATE OF CORRECTION

PATENT NO. : 6,651,314 B2
DATED : November 25, 2003
INVENTOR(S) : Hopeck

It is certified that error appears in the above-identified patent and that said Letters Patent is hereby corrected as shown below:

Column 4,
Lines 60 and 61, delete both occurrences of "51$i$" and insert -- 51/ --.

Column 6,
Line 21, insert -- a -- after "comprising coupling".
Line 42, insert -- wherein -- after "The method of claim 5".

Signed and Sealed this

Twentieth Day of January, 2004

JON W. DUDAS
*Acting Director of the United States Patent and Trademark Office*